United States Patent Office 2,947,751
Patented Aug. 2, 1960

2,947,751
DERIVATIVES OF DIHYDROERGOTAMINE

Georg Seitz, Darmstadt, and Karl Kritzer, Darmstadt-Arheilgen, Germany, assignors to E. Merck Aktiengesellschaft, Darmstadt, Darmstadt, Germany, a corporation of Germany No Drawing. Filed Mar. 27, 1958, Ser. No. 724,238

Claims priority, application Germany June 7, 1957

1 Claim. (Cl. 260—285.5)

This invention relates to dihydroergotamine. In particular it is directed to a novel highly water-soluble salt thereof, the diacetate; and methods of preparing the same.

It is known that the dihydro-derivatives of the laevorotatory ergot alkaloids are valuable pharmaceutical products. As they are practically insoluble in water, the possibilities of using them for therapeutic purposes are very limited. A transformation into salts has not resulted in a substantial improvement of the water solubility as is shown by the very limited successes which were obtained with the methanesulphonate and the tartrate of the dihydroergotamine. The methanesulphonate is moderately soluble in hot water and very difficult to dissolve in cold water. For the tartrate, a solubility in water of only 0.26% was found. A further disadvantage in the manufacture of dihydroergotamine salts is that the dihydroergotamine obtained from the hydrogenation of ergotamine is contaminated by an amorphous compound which very strongly adheres to it. Such impurity can be removed only by a frequent crystallization of the free base or the salts; and such recrystallization entails considerable losses.

It is among the objects of the present invention to eliminate the aforementioned shortcomings.

A further object is to provide a highly water-soluble salt of dihydroergotamine.

A still further object is to provide such a highly water-soluble salt in the form of dihydroergotamine diacetate; and to provide methods for the preparation thereof.

It has been found that one can obtain highly water-soluble salts when the free dihydroergotamine base or a salt thereof (other than the diacetate) is converted into the diacetate, in accordance with the methods customarily used for acetate production, as by means of two mols of acetic acid. If one starts from the free base, the simple addition of 2 mols of acetic acid is sufficient.

In order to directly convert salts into the diacetate, for example, ion exchangers or a double reaction with an excess of acetic acid can be used. It is most advantageous to work in solution, preferably in methanol or in another lower aliphatic alcohol. By utilizing a suitable concentration of the reactants the diacetate precipitates from the solution nearly quantitavely in crystalline form.

In order to crystallize this heretofore unknown salt, the following data may be used: Dihydroergotamine-diacetate of the block formula: $C_{33}H_{37}O_5N_5 \cdot 2C_2H_4O_2$ has specific rotation in methanol $(\alpha)_D^{22} = -16 \pm 1°$ (c=1) or in pyridine $(\alpha)_D^{24} = -57.0 \pm 1°$ (c=1).

The substance melts at 170° to 175° C. while undergoing decomposition. The diacetate is highly soluble in water and forms a clear liquid even when it is dissolved in an equal quantity of water.

It is very remarkable that an acetic acid salt of an alkaloid of low solubility is so readily soluble in water whereas the methanesulphonate produces unsatisfactory results in this respect.

A further and very surprising advantage is that the diacetate crystallizes out entirely free of impurities. Hence the new salt can also be used for the purification of dihydroergotamine and for the isolation thereof from mixtures.

The following are examples in accordance with this invention:

Example 1

The brownish yellow colored crude dihydroergotamine base (obtained from 50 g. of ergotamine tartrate by hydrogenation and alkalinizing) is dissolved in 100 cc. of glacial acetic acid and mixed with 200 cc. of methanol. After letting the mixture stand for a prolonged period in a refrigerator, the precipitate is sucked off and washed with a mixture of methanol, glacial acetic acid and ether in the proportions 2:1:3. Including a 2. crystallization obtained by further condensing of the liquor in vacuum, the yield is 46.5 g. of dihydroergotamine diacetate (87% of the theory).

Example 2

Two liters of methanolic final liquor obtained from the manufacture of dihydroergotamine tartrate of an approximately known content (corresponding approximately to 8 g. of base) and from which no more commercially vendible salts or bases can be obtained by the usual methods, are mixed with 20 cc. of glacial acetic acid and concentrated to about 400 cc. under vacuum. Then the solution is mixed with 400 cc. of water and further concentrated under vacuum until the solution is free of methanol. The resulting aqueous solution is poured into 500 cc. of 2.5% aqueous ammonia while being stirred, whereby the dihydroergotamine is deposited as an amorphous yellowish powder. The substance is sucked off, washed with 0.5% aqueous ammonia and dried over sulphuric acid under vacuum. Yield: quantitative.

The dry base is dissolved in twice the amount, by weight, of glacial acetic acid and methanol is added thereto in twice the volume of the glacial acetic acid. After letting the solution stand, the diacetate separates in crystalline form.

After sucking off the crystals and washing them with the mixture given in Example 1 and drying in vacuum over sodalime, the diacetate is completely pure and colorless. Yield: about 8 g.

By repeating the process, a second small fraction of equally pure diacetate can be obtained.

It will be understood that the foregoing description of the invention and the examples set forth are merely illustrative of the principles thereof. Accordingly, the appended claim is to be construed as defining the invention within the full spirit and scope thereof.

We claim:
Dihydroergotamine diacetate.

References Cited in the file of this patent
UNITED STATES PATENTS

| | | |
|---|---|---|
| 1,645,096 | Erdmann | Oct. 11, 1927 |
| 2,086,562 | Kussner | July 13, 1937 |
| 2,507,830 | Stoll et al. | May 16, 1950 |